(12) United States Patent
Printezis et al.

(10) Patent No.: US 7,890,711 B2
(45) Date of Patent: Feb. 15, 2011

(54) METHODS, APPARATUS, AND PROGRAM PRODUCTS FOR IMPROVED FINALIZATION

(75) Inventors: Antonios Printezis, Burlington, MA (US); Peter B. Kessler, Palo Alto, CA (US)

(73) Assignee: Oracle America, Inc., Redwood Shores, CA (US)

( * ) Notice: Subject to any disclaimer, the term of this patent is extended or adjusted under 35 U.S.C. 154(b) by 388 days.

(21) Appl. No.: 11/787,933

(22) Filed: Apr. 18, 2007

(65) Prior Publication Data

US 2008/0263295 A1 Oct. 23, 2008

(51) Int. Cl.
*G06F 12/00* (2006.01)
*G06F 13/00* (2006.01)

(52) U.S. Cl. .................. 711/159; 711/100; 711/154

(58) Field of Classification Search .............. 711/100, 711/154, 159
See application file for complete search history.

(56) References Cited

U.S. PATENT DOCUMENTS

| | | | | |
|---|---|---|---|---|
| 5,241,673 | A * | 8/1993 | Schelvis | 707/103 R |
| 5,900,001 | A * | 5/1999 | Wolczko et al. | 707/206 |
| 6,421,690 | B1 * | 7/2002 | Kirk, III | 707/206 |
| 6,473,773 | B1 * | 10/2002 | Cheng et al. | 707/200 |
| 7,107,426 | B2 * | 9/2006 | Kolodner et al. | 711/170 |
| 2002/0056019 | A1 * | 5/2002 | Kolodner et al. | 711/6 |
| 2002/0194421 | A1 * | 12/2002 | Berry et al. | 711/100 |
| 2003/0196061 | A1 * | 10/2003 | Kawahara et al. | 711/170 |
| 2006/0047920 | A1 * | 3/2006 | Moore et al. | 711/154 |
| 2006/0101032 | A1 * | 5/2006 | Sutter et al. | 707/100 |

OTHER PUBLICATIONS

Compiler-Cooperative Memory Management in Java (Extended Abstract), Mikheev et al, Excelsior LLC, 2001.*
How to Handle Java Finalization's Memory-Retention Issues, Printezis, Tony, retrieved from http://www.devx.com/Java/Article/30192, published Dec. 27, 2005.*
Just Say No to Finalize Methods; Rector, Brent; Developer.com; Jul. 9, 2003.*
Garbage Collection: Automatic Memory Management in the Microsoft .Net Framework; Richter, Jeffrey; MSDN Magazine; Nov. 2000.*
Publication: *"How to Handle Java Finalizations's Memory-Retention Issues"*, by Tony Printezis, downloaded from the internet Jan. 22, 2007: http://www.devx.com/Java/Article/30192.

(Continued)

*Primary Examiner*—Tuan V. Thai
(74) *Attorney, Agent, or Firm*—Park, Vaughan, Fleming & Dowler LLP

(57) ABSTRACT

Apparatus, methods, and computer program products are disclosed that improve management of a dynamic memory area. One aspect is a method that reclaims memory referenced by a finalizable-object that has been instantiated from a class definition that incorporates at least one parent class and one or more class-extensions into a class hierarchy. The method includes marking for retention a related memory reachable from a reference field of the finalizable-object, and adding the finalizable-object to a finalization set for subsequent invocation of a non-trivial finalize-method. The method also determines whether the portion of the finalizable-object that includes the reference field to the related memory is a class-extension that has a finalizer-free characteristic and conditions the marking for retention on that determination. Thus, a portion the finalizable-object's related memory can be more quickly reclaimed from a dynamic memory area.

17 Claims, 4 Drawing Sheets

OTHER PUBLICATIONS

Publication: "*Compiler-Cooperative Memory Management in Java (Extended Abstract)*" by Vitaly V. Mikheev et al. A. P. Ershov Institute of Informatics Systems, Excelsior LLC, Novosibirsk, Russia, vmikheev,sfedoseev@excelsior-usa.com.

* cited by examiner

METHODS, APPARATUS, AND PROGRAM PRODUCTS FOR IMPROVED FINALIZATION

BACKGROUND

1. Technical Field

The disclosed technology relates to optimizing computer memory usage.

2. Background Art

One skilled in the art will understand that in many Object-Oriented-Programming (OOP) environments, the root class of a class hierarchy is the foundation class of the class hierarchy and has no superclasses. The root class can be extended by a subclass such that the root class is the superclass of the subclass. The subclass inherits the properties and methods of its superclass. A subclass can itself be extended and serve as a superclass for its own subclasses. A subclass can extend the capability of its superclass. In some programming languages, a subclass can inherit from multiple superclasses while in other programming languages the subclass can only inherit from a single superclass. The root class is conventionally referred to as being at the top of the class hierarchy. Each descendent of the root class extends the definition of its superclass by a class-extension. Thus, for Class C that is a subclass of Class B, which is a subclass of root-Class A, the class definition for Class A has two class-extensions; one to extend Class A to Class B and one to extend Class B to Class C.

An object is instantiated from the object's class. Thus, if the object's class is not the root class the object will be instantiated from a subclass of the root class. When the object is instantiated, sufficient memory is allocated to store the reference fields (for example, class/object variables) defined by the object's class including its superclasses. Execution of the methods defined in the object's class hierarchy can allocate memory from a dynamic memory area (for example, the heap) and cause a reference to the allocated memory to be stored in a reference field within the object's class hierarchy. The memory used to instantiate an object can be from the same or different dynamic memory area.

An executing program generally instantiates many objects. The relationship between the objects can be represented by an object graph. Allocated memory that can not be reached through a reference in the object graph is unreachable.

Many programs, in particular those written using the object-oriented paradigm, dynamically allocate, use, and reclaim memory during execution. Programmers using a procedural programming paradigm or hybrid programming paradigm (such as C++) require explicit programming to reclaim memory allocated from the dynamic memory area that is no longer used. Correctly determining when memory is not in use is a well-known and difficult aspect of programming. Incorrectly retaining unused memory results in "memory leakage" such that the memory available in the dynamic memory area decreases over time as the dynamic memory area becomes polluted with no-longer-used, but not reclaimed memory.

Modern computer languages are designed with a garbage collection capability that automatically detects and reclaims allocated but unreachable memory. This capability relieves the programmer of the memory management burden and removes the possibility of "memory leakage". Garbage collection techniques are well known in the art and, for example, discover allocated memory that is unreachable by any strong reference in the object graph.

Some unreachable objects may need to perform clean-up operations prior to reclamation of the memory allocated to, or memory referenced by that object (its related memory). For example, if the object has allocated a system resource such as a file, socket, user interface element, etc. prior to becoming unreachable the information about that resource is contained in the object's related memory. To support this capability, many OOP environments include a finalization logic that can invoke the object's finalize-method prior to reclaiming the object's related memory. The finalize-method can then perform any desired clean-up operations to release the system resource using the object's related memory. The object's related memory can only be reclaimed if that memory can only be reached through that object (that is, if the memory is related to two objects, one of which is reachable from the object graph, then that memory is not solely reachable from the other object and cannot be reclaimed).

In addition, in some programming environments (such JAVA), the finalize-method can reattach the object to the object graph such that the object and its related memory are again reachable from the object graph.

The runtime environment generally recovers allocated but unreachable memory by the garbage collection system discovering such memory as a discovered reference and queuing the discovered reference onto a finalization queue (or by adding it to a finalization set) as a finalizable-object. After adding the discovered reference to the finalization set objects in the discovered reference are finalizer-reachable in that the discovered reference is reachable from the finalization logic but is still unreachable from other portions of the object graph. The finalization logic (after some indeterminate but potentially significantly long period of time) can invoke the finalize-method of the finalizable-object. The finalize-method then can access the object's related memory and release system resources or perform other programmed operations prior to the memory containing the object (and other related memory that is solely referenced by the object) being reclaimed. The invocation of the finalize-method by the finalization logic changes the state of the object from finalizable to finalized. After the finalize-method completes, the finalization logic performs whatever steps are needed to reclaim, or enable reclamation of the finalized object and its related memory.

One embodiment of the technology described above is used in the JAVA program environment (See section 12.6.1 of the JAVA Language Specification $3^{rd}$ ed.). In this embodiment every object can be characterized by two attributes: the object may be reachable, finalizer-reachable, or unreachable, and the object may also be unfinalized, finalizable or finalized. While JAVA-related terminology is used herein to help describe the technology, the claims are not limited to JAVA and extend to any technology that has problems equivalent to those described.

One skilled in the art will understand that an object is created by instantiating a class definition. The class definition can include a finalize-method. Such a one will also understand the difference between a trivial finalize-method and a non-trivial finalize-method. That is, class hierarchies used to instantiate objects often include a trivial finalize-method at the root of the class hierarchy. This trivial finalize-method can be overridden by a non-trivial finalize-method defined by a subclass lower in the class hierarchy. Some finalization logic implementations may invoke all finalize-methods including trivial finalize-methods; other implementations are optimized to only invoke non-trivial finalize-methods.

One of the problems with prior-art finalization is that once an object is added to the finalization set (as a finalizable-object), the finalizable-object's related memory as well as other objects and their related memory that are reachable through the finalizable-object must be retained until the finalizable-object's finalize-method is invoked and the finalizable-object becomes finalized. This problem occurs even if the finalizable-object's finalize-method will not access a related memory and even if that related memory is solely reachable through the finalizable-object. This situation can drastically reduce the amount of available memory in the dynamic memory area. One common example is when a programmer subclasses a library class without recognizing that the library class includes a non-trivial finalize-method.

TABLE 1

```
class A {
    Object x;
}
class B extends A {
    Object y;
    public void finalize( ) {
        dispose( );
    }
    public void dispose( ) {
        "use y";
    }
}
class C extends B {
    Object z;
}
```

Table 1 represents code written in the Java™ programming language that demonstrates the above problem. Assume that object-c is instantiated from Class C. Class C reserves space (a reference field) for object-z, but because Class B extends Class A and Class C extends Class B, the instantiation of object-c also reserves space for object-x and object-y. Sometime after object-c becomes unreachable, the garbage collection system will discover object-c and add it to the finalization set (making object-c a finalizable-object). This means that all of object-c's related memory—memory used for and/or referenced by object-x, object-y and object-z—will be retained even though object-z is not needed by the finalize-method. This retention of memory that will not be accessed by the finalize-method restricts the amount of dynamic memory available to the program.

To assist in the discussion of the technology, the portion of Class B that is not part of Class A is termed "a class-extension". Thus, assuming the Class A is the root class, Class C consists of the root class and two class-extensions.

The inventors have previously realized that these problems can be overcome in JAVA by bypassing JAVA's finalization logic coupled with complex class design the use of weak references. This technique is explained in "*How to Handle Java Finalization's Memory-Retention Issues*" published Dec. 27, 2005, by Tony Printezis. This paper is included with the Information Disclosure filed herewith or prior to the first office action. The inventors are not aware of any finalization technology that addresses the above problems.

It would be advantageous to provide a programming environment that does not retain objects, memory, and/or resources that are not used by the finalize method of a superclass.

DETAILED DESCRIPTION

One aspect of the technology disclosed herein is an improved method that reclaims memory referenced by a finalizable-object that has been instantiated from a class definition that incorporates at least one parent class and one or more class-extensions into a class hierarchy. The method includes marking for retention a related memory reachable from a reference field of the finalizable-object, and adding the finalizable-object to a finalization set for subsequent invocation of a non-trivial finalize-method. The method also determines whether the portion of the finalizable-object that includes the reference field to the related memory is a class-extension that has a finalizer-free characteristic and conditions the marking for retention on that determination. Thus, a portion the finalizable-object's related memory can be more quickly reclaimed from a dynamic memory area. Apparatus and Program Products can perform the method.

Figure 1:
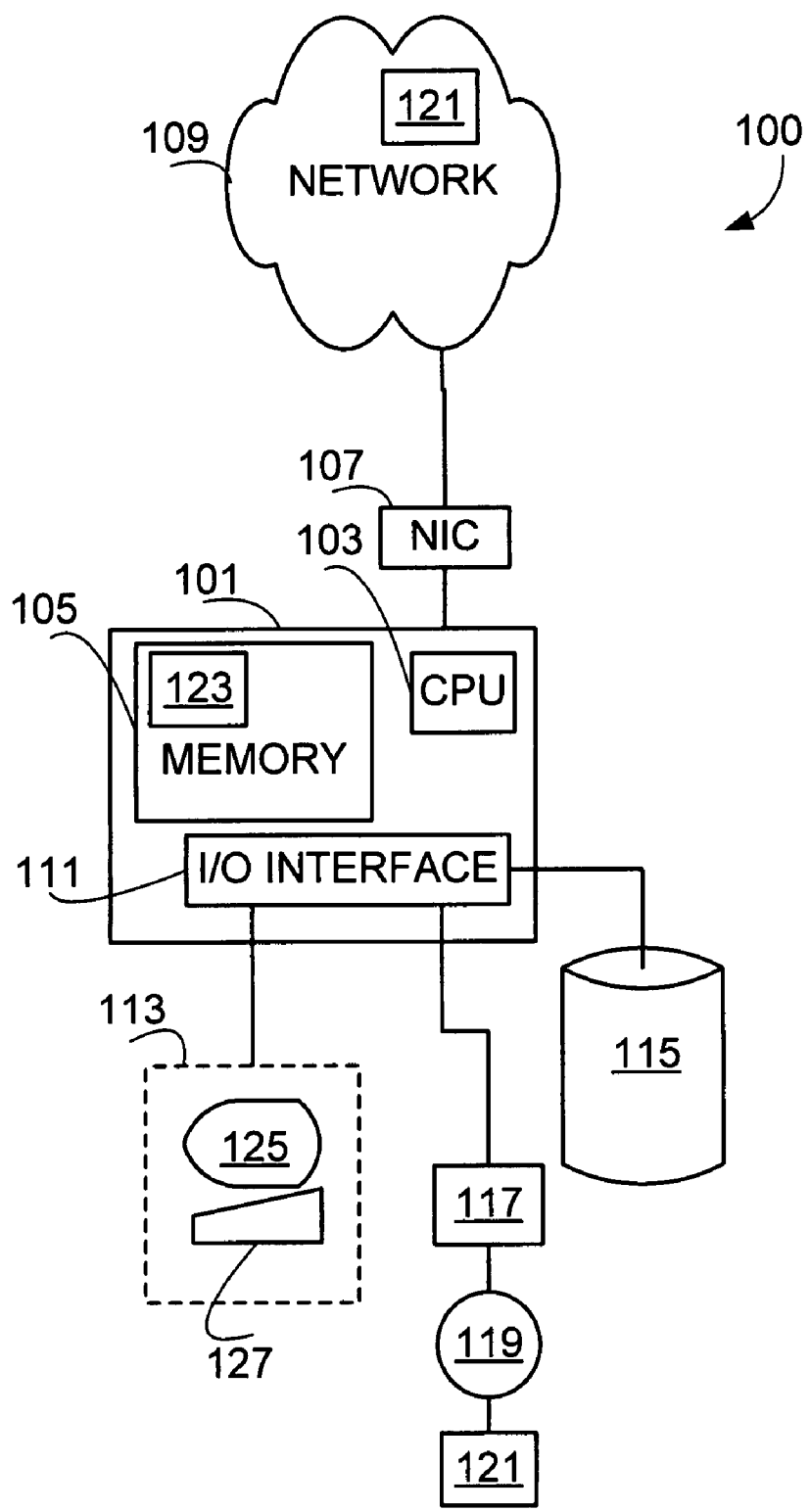
FIG. 1 illustrates a computer system that can be used to embody the disclosed technology.

FIG. 1 illustrates a computer system 100 that can incorporate an embodiment of the technology disclosed herein. The computer system 100 includes a computer 101 that incorporates a CPU 103, a memory 105, and optionally a network interface 107. The network interface 107 can provide the computer 101 with access to a network 109. The computer 101 also includes an I/O interface 111 that can be connected to a user interface device(s) 113, a storage system 115, and a removable data device 117. The removable data device 117 can read a computer-usable data medium 119 (such as a fixed or replaceable ROM within the removable data device 117 itself (not shown)); as well as a computer-usable data medium that can be inserted into the removable data device 117 itself (such as a memory stick, CD, floppy, DVD or any other tangible media) that typically contains a program product 121. The user interface device(s) 113 can include a display device 125 and a user input device 127. The storage system 115 (along with the removable data device 117), the computer-usable data medium 119, and (in some cases the network 109) comprise a file storage mechanism. The program product 121 on the computer-usable data medium 119 is generally read into the memory 105 as a program 123 which instructs the CPU 103 to perform specified operations. In addition, the program product 121 can be provided from devices accessed using the network 109. One skilled in the art will understand that not all of the displayed features of the computer 101 need to be present for all embodiments that implement the techniques disclosed herein. Further, one skilled in the art will understand that computers are ubiquitous within modern devices ranging from as cell phones to vehicles to kitchen appliances etc. and include without limitation sound devices, video devices, display devices, user interface devices, network devices, storage systems, timekeeping device, control system, home security system, and manufacturing apparatus.

Figure 2:
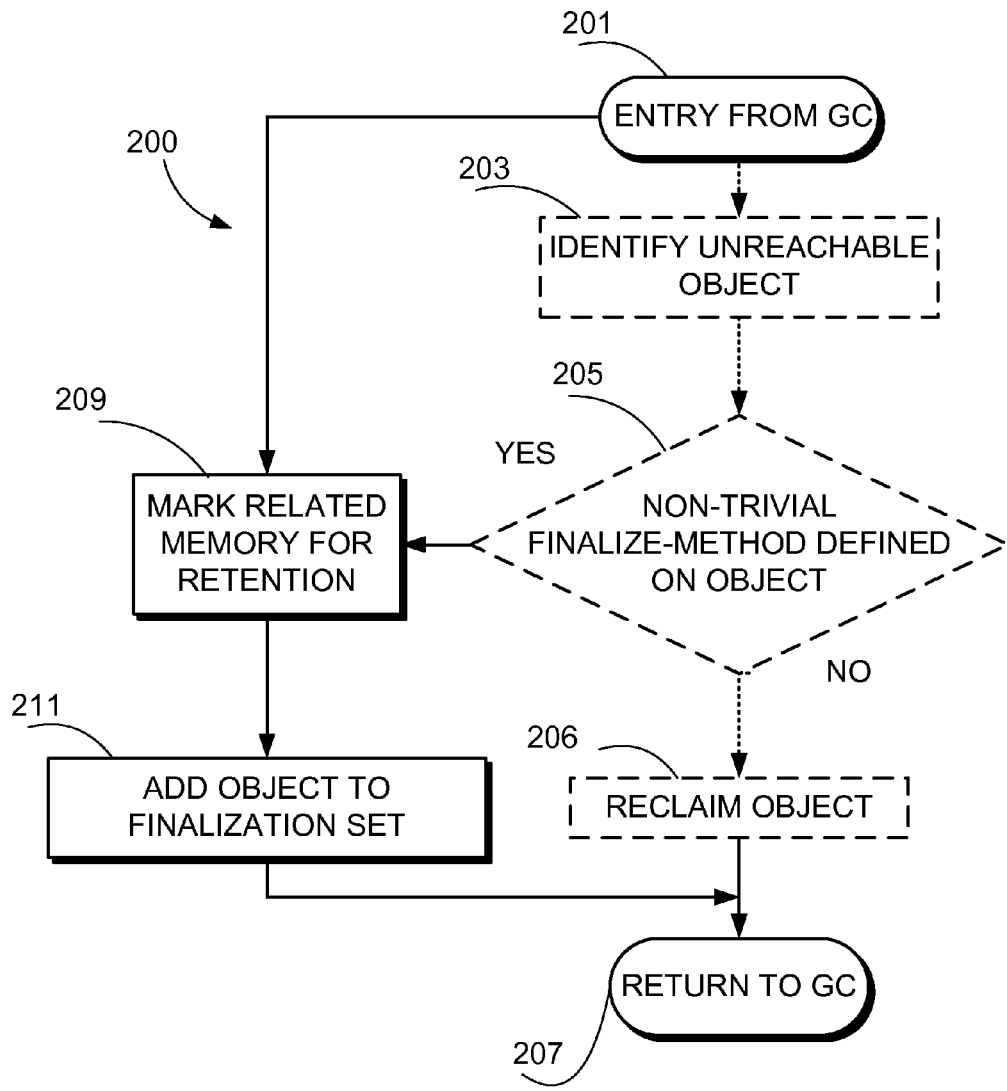
FIG. 2 illustrates a portion of a prior-art garbage collector-to-finalization-interface process.
Figure 4:
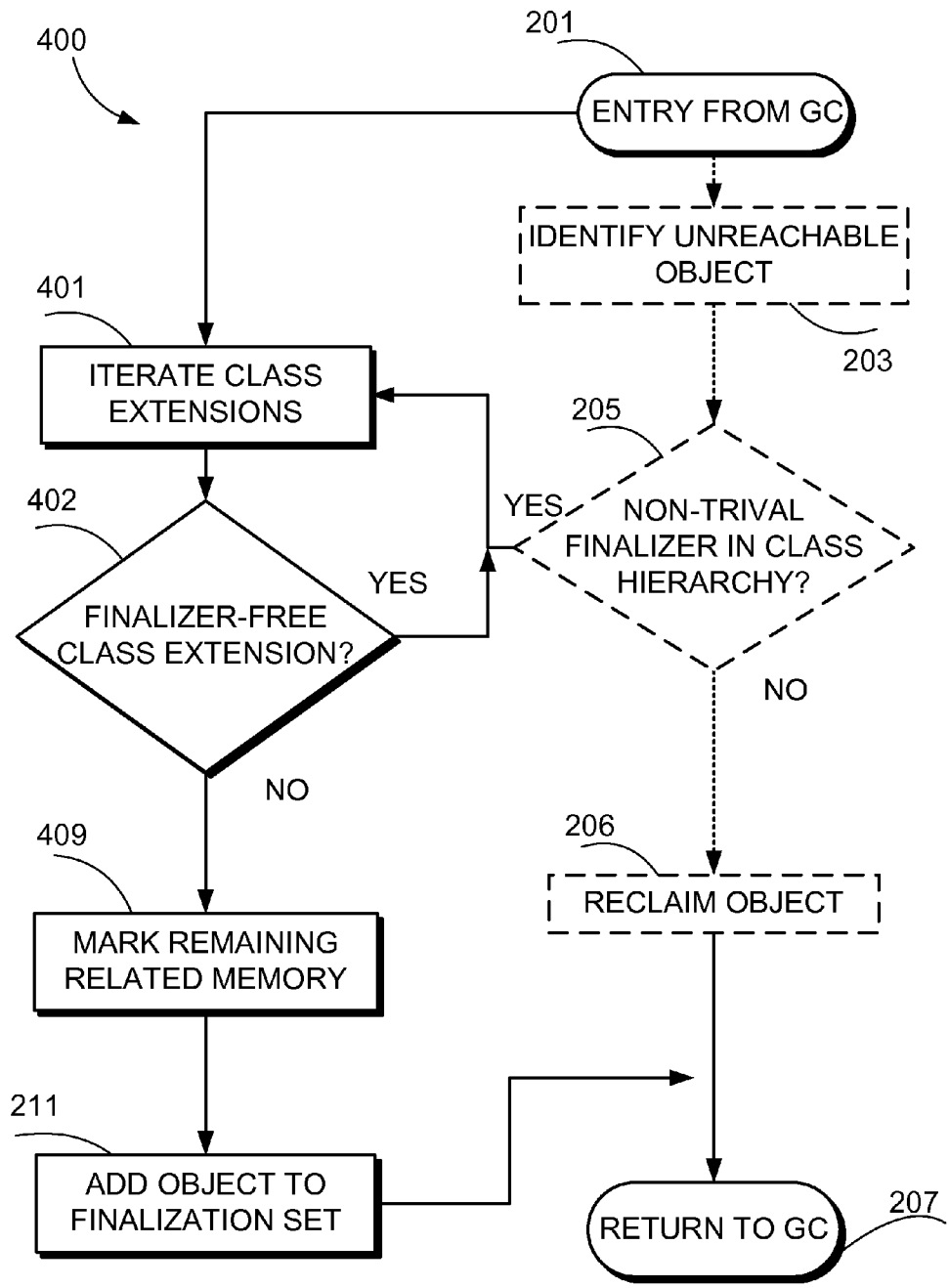
FIG. 4 illustrates an improved garbage collector-to-finalization-interface process.

The inventors have realized that the previously described problems can be solved by using a new approach to finalization. To help understand the operation of claimed technology, is advantageous to first discuss how finalization is performed by the prior art. FIG. 2 and FIG. 4 each include optional optimization and/or function capability. These are indicated by dashed boxes and lines.

FIG. 2 illustrates a prior-art garbage collector-to-finalization-interface process 200. A garbage collector process invokes the prior-art garbage collector-to-finalization-interface process 200 after discovering an allocated area of the memory 105 that is unreachable by the program. The garbage collector can pass a discovered reference to the allocated but unreachable memory (and in some embodiments can pass information related to the unreachable object(s) contained in the discovered memory) and invokes the prior-art garbage collector-to-finalization-interface process 200 via an 'entry' terminal 201. The prior-art garbage collector-to-finalization-interface process 200 continues to an 'optional identify unreachable object' procedure 203 that can examine the discovered area of the memory 105 to identify unreachable objects contained in the allocated but unreachable memory. The 'optional identify unreachable object' procedure 203 can use information retained by the runtime to help identify the unreachable object(s) (for example, special references known to the runtime that are not part of the object graph—in JAVA for example, soft, weak, and phantom references). Other garbage collection systems can themselves detect that an object is no longer referenced by the object graph and can pass such an unreachable object directly to the prior-art garbage collector-to-finalization-interface process 200.

In an optimized embodiment of the prior-art garbage collector-to-finalization-interface process 200, an 'optional non-trivial finalize-method defined on object' decision procedure 205 examines the unreachable object(s) in the discovered reference to determine whether the unreachable object contains a non-trivial finalize-method. If the unreachable object only contains a trivial finalize-method, the prior-art garbage collector-to-finalization-interface process 200 can continue to an 'optional reclaim object' procedure 206 that can immediately reclaim the memory used to contain the unreachable object as well as any memory that is solely referenced by the unreachable object. If the 'optional reclaim object' procedure 206 optimization is not implemented, such memory will be reclaimed on a subsequent garbage collection cycle. The prior-art garbage collector-to-finalization-interface process 200 then returns execution to the garbage collector through a 'return' terminal 207.

The determination of whether a finalize-method is a non-trivial finalize-method or trivial finalize-method can extend from determining whether the finalize-method is defined by the root class or defined by a class-extension; to determining whether or not the finalize-method would be invoked by using compiler or runtime optimization process.

A 'mark related memory for retention' procedure 209 can be executed by a non-optimized embodiment of the prior-art garbage collector-to-finalization-interface process 200 or by an optimized version that detects a non-trivial finalize-method at the 'optional non-trivial finalize-method defined on object' decision procedure 205. The 'mark related memory for retention' procedure 209 evaluates each of the unreachable object's reference fields, locates any related memory and/or object referenced by the reference fields and flags that related memory with a retain memory mark to prohibit that memory from being reclaimed by subsequent garbage collection cycles. The retain memory mark remains until after the object's non-trivial finalize-method is invoked. The prior-art garbage collector-to-finalization-interface process 200 continues to an 'add object to finalization set' procedure 211 that adds the unreachable object to a finalization set (such as a finalization queue or other data/object structure) as a finalizable-object. The prior-art garbage collector-to-finalization-interface process 200 then returns execution to the garbage collector through the 'return' terminal 207.

With regard to the 'optional reclaim object' procedure 206, in some embodiments a related memory referenced solely through a reference field in the unreachable object can be immediately reclaimed. In other embodiments, just the memory storing the unreachable object is reclaimed and subsequent garbage collection cycles will locate and reclaim related memory that becomes unreachable as a consequence of finalizing the unreachable object.

The finalizable-object remains in the finalization set until the finalization logic invokes the finalizable-object's finalize-method or the program terminates. The finalization logic invokes the object's finalize-method (as subsequently described with respect to FIG. 3) at some indeterminate time after the object is added to the finalization set.

One skilled in the art will understand that a non-optimized embodiment of the prior-art garbage collector-to-finalization-interface process 200 can simply perform the 'mark related memory for retention' procedure 209 and the 'add object to finalization set' procedure 211 and need not include the 'optional non-trivial finalize-method defined on object' decision procedure 205 and the 'optional reclaim object' procedure 206. Such a one will also understand the 'optional identify unreachable object' procedure 203 may or may not be needed depending on the architecture of and the interaction between the garbage collection system and the runtime. Such a one will understand that the process illustrated by FIG. 2 can be implemented as a finalization-interface logic completely within custom designed hardware, software executed by a processor, or some combination thereof.

Figure 3:
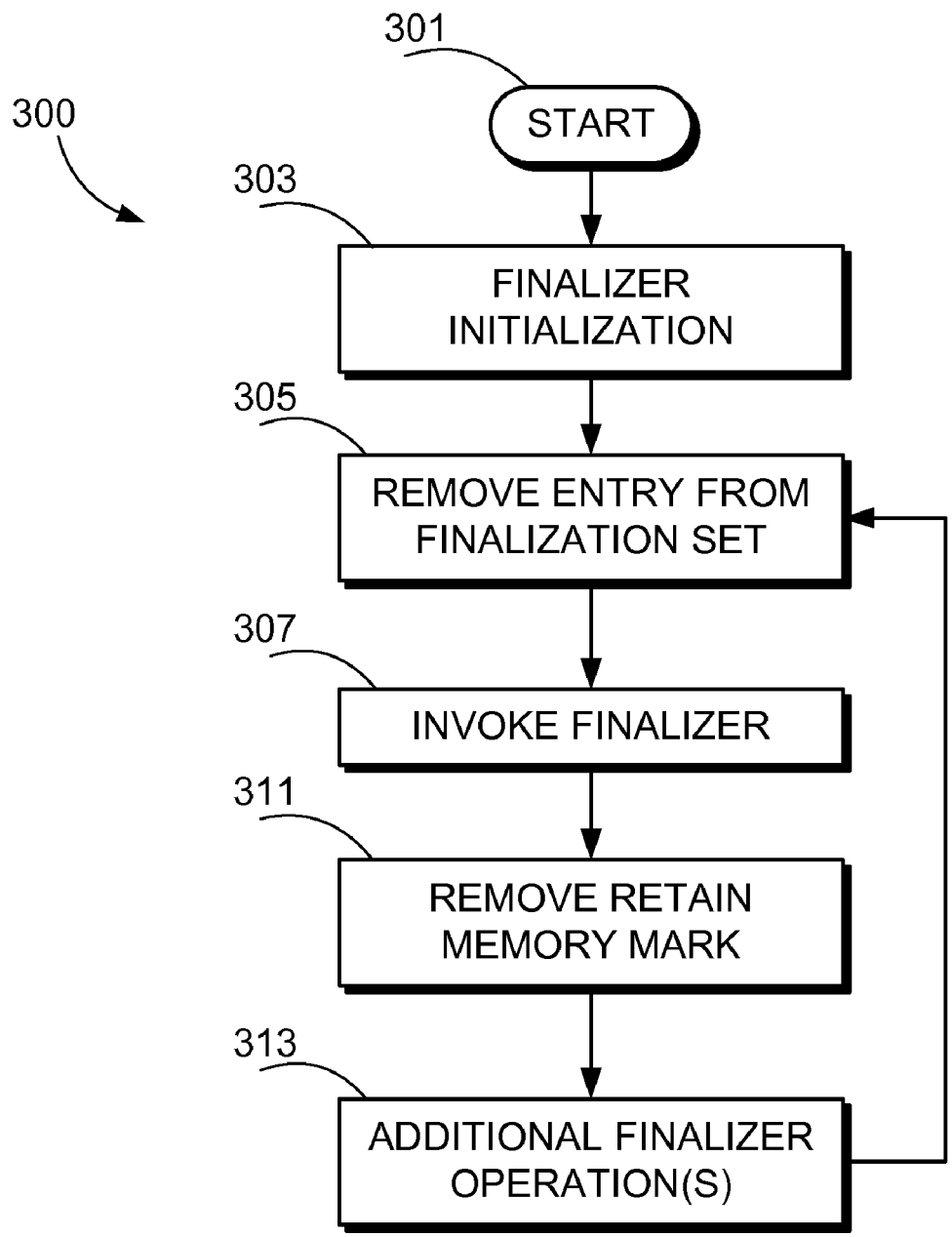
FIG. 3 illustrates a prior-art finalization process that can be used with the finalizer process of FIG. 2 or FIG. 4.

FIG. 3 illustrates a prior art finalization process 300 that processes finalizable-objects in the finalization set. The prior art finalization process 300 is generally implemented as one or more threads or other lightweight execution stream. In the embodiment shown, the prior art finalization process 300 is a thread that is invoked at an appropriate time (such at system startup, or in response to an event) and that initiates at a 'start' terminal 301.

The prior art finalization process 300 initializes itself at a 'finalizer initialization' procedure 303 and continues to a 'remove entry from finalization set' procedure 305 that waits for an object to be placed in the finalization set, for available memory in the dynamic memory area to become critically low, on an interval timer, or on other events known to one skilled in the art. Once one of these conditions occur (or some combination of these conditions), the 'remove entry from finalization set' procedure 305 removes the finalizable-object that was added to the finalization set by the 'add object to finalization set' procedure 211 of FIG. 2 (and, as will be seen, of FIG. 4).

Next an 'invoke finalizer-method' procedure 307 invokes the finalize-method of the finalizable-object to perform its programmed operations (the finalize-method can be trivial or non-trivial). At completion of the finalize-method the object becomes finalized. A 'remove retain memory mark' procedure 311 then removes the reclamation restriction that was placed on any related memory by the 'mark related memory for retention' procedure 209 (or by a 'mark remaining related memory' procedure 409 that will be subsequently discussed with respect to FIG. 4). For many garbage collection systems, the 'mark related memory for retention' procedure 209 and the 'mark remaining related memory' procedure 409 marks the related memory for retention by maintaining the reference to the related memory in the reference field of the object. Thus, while the object is in the finalization set, the related memory accessible through non-null reference fields will not be reclaimed. Once the object becomes finalized the reclamation restriction is removed when the object is deleted from the finalization set and/or when the reference fields are nulled. In addition, the 'mark remaining related memory' procedure 409 can null reference fields that are not marked for retention.

Once the reclamation restriction on the related memory is removed, subsequent garbage collection cycles will reclaim the memory used by the now-finalized object as well as related memory that was solely referenced by the now-finalized object. Finally an 'additional finalizer operation' procedure 313 performs any other operations needed to maintain the prior art finalization process 300. Such operations can include, without restriction, bookkeeping operations, timer maintenance operations, etc. The prior art finalization process 300 returns to the 'remove entry from finalization set' procedure 305 to continue processing other finalizable-objects. Some embodiments of the prior art finalization process 300 will empty the finalization set on each cycle; other embodiments need not finalize all the finalizable-objects on each iteration.

In some embodiments, the mark removed by the 'remove retain memory mark' procedure 311 can be a reference to the memory contained in the finalizable-object.

To summarize: Where a finalizable-object was instantiated from a class definition that incorporates at least one parent class and one or more class-extensions from within a class hierarchy, the prior art process for reclaiming a related memory referenced by the finalizable-object includes marking for retention the related memory reachable from a reference field of the finalizable-object and adding the finalizable-object to a finalization set for subsequent invocation of the finalizable-object's finalize-method.

From the teachings related to FIG. 2 and FIG. 3, one skilled in the art will understand that so long as a class defines a finalize-method that will cause an object in a discovered reference to be placed in the finalization set, any related memory allocated by instantiation or operation of that class will not be reclaimed until after the prior art finalization process 300 actually invokes the object's finalize-method and removes the retain memory mark or other reclamation restriction from the object's related memory. Because the programmer has no control over when a finalizable-object is actually finalized, significant amounts of allocated but unreachable memory can remain in the program's dynamic memory area. This retained memory can badly impact the performance of a program (for example, by requiring more cycles of the garbage collection system, by increasing the time needed to allocate memory for instantiation of or use by an object, etc.).

One skilled in the art will understand that there are many possible embodiments of the prior art finalization process 300 that may differ in significant detail from that shown in FIG. 3. Such a one will also understand the disclosed prior-art concepts and memory reclamation technology is equivalent to what has been previously described herein.

FIG. 4 illustrates an improved garbage collector-to-finalization-interface process 400 for reclaiming related memory referenced by a finalizable-object and that addresses the previously discussed problems. FIG. 4 includes the 'entry' terminal 201, the 'optional identify unreachable object' procedure 203, the 'optional reclaim object' procedure 206, the 'add object to finalization set' procedure 211, and the 'return' terminal 207 that perform substantially the same operations as previously described with respect to FIG. 2. However the 'mark related memory for retention' procedure 209 is replaced by an 'iterate class-extension' procedure 401, a 'finalizer-free class-extension' decision procedure 402 and a 'mark remaining related memory' procedure 409.

A class-extension that has the finalizer-free characteristic is defined to be a class-extension for which related memory defined by the class-extension is not to be accessible to a non-trivial finalize-method defined by a class-extension higher in the class hierarchy. Thus, a class-extension has the finalizer-free characteristic if it does not define a non-trivial finalize-method and none of the class-extensions lower in the class hierarchy define a non-trivial finalize-method. Finalizer-free class-extensions extend from the class-extension immediately below the lowest class-extension that defines a non-trivial finalize-method to the lowest class-extension in the object's class hierarchy (the ultimate class-extension). If the ultimate class-extension of the object defines a non-trivial finalize-method then none of the class-extensions have the finalizer-free characteristic.

The references defined by finalizer-free class-extensions will not be accessible to the non-trivial finalize-method higher in the class hierarchy. Thus, the goal of the 'iterate class-extension' procedure 401 and the 'finalizer-free class-extension' decision procedure 402 is to find the highest class-extension (closest to the root class) in the class hierarchy that has the finalizer-free characteristic (and for which all lower class-extensions also have the finalizer-free characteristic).

The embodiment illustrated by FIG. 4 is one way to achieve the above goal. One skilled in the art will understand that there exist many equivalent ways to determine which of the class-extensions have the finalizer-free characteristic. In this embodiment, the 'iterate class-extension' procedure 401 iterates from the object's ultimate class-extension toward the root class. For each iterated class-extension, the 'finalizer-free class-extension' decision procedure 402 determines whether a non-trivial finalize-method is defined in the class-extension. If a non-trivial finalize-method is not defined in the class-extension, the improved garbage collector-to-finalization-interface process 400 loops back to the 'iterate class-extension' procedure 401 to continue the iteration of class-extensions.

However, if the 'finalizer-free class-extension' decision procedure 402 determines that the class-extension does define a non-trivial finalize-method the improved garbage collector-to-finalization-interface process 400 continues to a 'mark remaining related memory' procedure 409. The 'mark remaining related memory' procedure 409 is similar to the 'mark related memory for retention' procedure 209 with the difference being that it only applies a reclamation restriction on related memory that is referenced by class-extensions extending towards the root class from the lowest class-extension that defines a non-trivial finalize-method inclusive.

After the reclamation restrictions are placed on the related memory referenced by class-extensions that do not have finalizer-free characteristic, the improved garbage collector-to-finalization-interface process 400 adds the unreachable object to the finalization set (as a finalizable-object) for eventual invocation of its finalize-method (as previously described with respect to the 'add object to finalization set' procedure 211). Once in the finalization set the object may (eventually) be processed in accordance with the prior art finalization process 300 of FIG. 3.

Because the related memory referenced by finalizer-free class-extensions does not have a reclamation restriction and if it was strongly reachable solely from referenced by the finalizable-object the garbage collection system will be able to reclaim the memory on its next reclamation cycle while the finalizable-object is still unfinalized instead of remaining in memory until (and if) the finalizable-object's finalize-method is invoked. Thus, by selecting a class-extension from the finalizable-object, that corresponds to a portion of the finalizable-object that includes the reference field to related memory, determining whether the class-extension has a finalizer-free characteristic and marking the related memory for retention only if the class-extension does not have the finalizer-free characteristic, enables reclamation of the related memory prior to invocation of the finalizable-object's non-trivial finalize-method.

In some embodiments, the 'mark remaining related memory' procedure 409 can include the capability of determining whether the related memory, which can be accessed through a reference field of the finalizer-free class-extension, is strongly reachable solely through that field. In such an embodiment, the 'mark remaining related memory' procedure 409 can immediately reclaim the related memory.

In some embodiments, the removal of the reclamation restriction for the related memory is accomplished by clearing the contents of the reference field that references the related memory.

One skilled in the art will understand that in some embodiments the 'mark related memory for retention' procedure 209 and the 'mark remaining related memory' procedure 409 can be identical. Such a one will also understand that the prior-art garbage collector-to-finalization-interface process 200 can be an internal part of the garbage collector system or can be invoked as a thread or process by the garbage collector system. Such a one will understand the advantage of the disclosed technology and in particular will understand that allocated but unreachable memory will be more quickly reclaimed and made available to the program. Such a one will understand that the process illustrated by FIG. 4 can be implemented as an improved finalization-interface logic completely within custom designed hardware, software executed by a processor, or some combination thereof. Such an improved finalization-interface logic can include a selection logic, a determination logic, a conditional marking logic, as well as a now-reclaimable memory determination logic, an immediate memory reclamation logic, and a completion logic, The technology disclosed with respect to FIG. 4 can be more formally described as: In a class hierarchy C0 to CN (C0 being the root of the hierarchy); assume that class-extension Ci ($0<i<=N$) has defined a non-trivial finalize-method and that all class-extensions Cj ($i<j<=N$) do not define a finalize-method. When an instance of a class (an object) Ck ($i<k<=N$) is about to be added to the finalization set (for example, queued up for finalization), any objects (or memory) that were referenced through these reference fields are not automatically retained pending finalization. Thus, the non-trivial finalize-method of Ci will still be able to access reference fields defined on Ci and its superclasses, without retaining unnecessary memory while the instance of Ck is in the finalization set and waiting to for its non-trivial finalize-method to be invoked before being reclaimed.

One skilled in the art will understand from the discussion herein that the class hierarchy includes a set of hierarchically contiguous class-extensions; that an object is instantiated from an instantiating class in the class hierarchy; that the class used to instantiate the object has an ultimate class-extension which is the lowest class-extension of the instantiating class; that the set of hierarchically contiguous class-extensions in the instantiating class extends from the ultimate class-extension upwards toward the root class; that the set of hierarchically contiguous class-extensions define reference fields for the object; and that if the ultimate class-extension has the finalizer-free characteristic then related memory accessed through the reference fields defined by the ultimate class-extension need not be marked for retention when the object is placed in the finalization set. Such a one will also understand that related memory for class-extensions extending upward in the class hierarchy from the ultimate class-extension need not be marked for retention until a class-extension is reached that does not have the finalizer-free characteristic.

Typically not all the fields defined on Ci's subclasses (Cj) will be accessed by the non-trivial finalize-method of Ci. However, one skilled in the art will understand that there may be times when a reference field of a subclass of Ci may be needed by the non-trivial finalize-method defined on Ci (for example if C overrides the dispose( ) method). In this, or

TABLE 2

```
class A {
    Object x;
}
class B extends A {
    Object y;
    public void finalize( ) {
        dispose( );
    }
    public void dispose( ) {
        "use y";
    }
}
class C extends B {
    Object z;
    public void dispose( ) {
        "use z";
        super.dispose( );
    }
}
``` other instances where the non-trivial finalize-method accesses a subclass, the programmer must explicitly define a non-trivial finalize-method on the subclass.

Table 2 is an example class hierarchy that illustrates this situation. Here, before object-c (the object instantiated from Class C) is inserted into the finalization set, the memory related to reference field-z will not have a reclamation restriction (because Class B has defined a finalize-method and Class C has not—thus the class-extension for Class C has the finalizer-free characteristic). So, anything reachable from object-c through reference field-z will not be automatically retained when object-c is inserted into the finalization set. However, when Class B's finalize-method is invoked, it will first pass execution to Class C's dispose method that uses object-c's reference field-z. This will cause the Class B's finalize-method to fail as the related memory of reference field-z has likely been reclaimed. Thus, if a programmer overrides a method used by a non-trivial finalize-method used by a superclass of Class C, the programmer must include a non-trivial finalize-method in Class C such as shown below:

```
public void finalize( ) {
    super.finalize( );
}
```

One skilled in the art will understand that the network transmits information (such as informational data as well as data that defines a computer program). Programs and data are commonly read from tangible physical media (such as a compact, floppy, or magnetic disk).

One skilled in the art will understand that the use of JAVA-specific terminology does not limit the scope of the claims to the JAVA language or runtime, but serves as a convenient embodiment to discuss aspects of the disclosed technology.

From the foregoing, it will be appreciated that the technology has (without limitation) the following advantages:

1) It improves the management of a dynamic memory area by more quickly reclaiming memory that will not be accessed during finalization of an object. This improved management also improves the performance of programs that use the dynamic memory area.

2) It allows developers to freely subclass third-party without concern related to potential stealth memory retention problems.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A computer controlled method for reclaiming memory referenced by a finalizable-object, said finalizable-object having been instantiated from a class definition incorporating at least one parent class and one or more class-extensions into a class hierarchy; the method comprising marking for retention a related memory reachable from a reference field of said finalizable-object, and adding said finalizable-object to a finalization set for subsequent invocation of a non-trivial finalize-method; wherein the improvement comprises:
    iterating from an ultimate class-extension of said finalizable-object toward a root class of said finalizable-object:
        selecting an iterated class-extension, said class-extension corresponding to a portion of said finalizable-object that includes said reference field;
        determining whether said class-extension has a finalizer-free characteristic;
        in response to determining that said class-extension has a finalizer-free characteristic, marking said related memory for reclamation so that the related memory can be reclaimed by a garbage collection process before an invocation of finalize methods, wherein for any class-extension before a first class-extension without a finalizer-free characteristic, said related memory is marked for reclamation; and
    in response to determining that said class-extension does not have a finalizer-free characteristic, marking said related memory for retention, wherein said related memory cannot be reclaimed until after the invocation of said non-trivial finalize-method.

2. The computer controlled method of claim 1, wherein conditionally performing the marking for retention further comprises:
    determining whether said related memory is strongly reachable solely through said reference field; and
    reclaiming said related memory.

3. The computer controlled method of claim 1, wherein selecting, determining, and conditionally performing are applied to each of a first collection of class-extensions from said one or more class-extensions of said finalizable-object.

4. The computer controlled method of claim 3, wherein the method completes responsive to the determination that said class-extension does not have said finalizer-free characteristic.

5. The computer controlled method of claim 1, wherein said class hierarchy comprises a set of hierarchically contiguous class-extensions that have said finalizer-free characteristic, said set of hierarchically contiguous class-extensions including an ultimate class-extension; said set of hierarchically contiguous class-extensions defining a plurality of reference fields in said finalizable-object and said plurality of reference fields including said reference field.

6. The method of claim 1, wherein the method further comprises:
    upon determining that a class-extension does not have a finalizer-free characteristic, while iterating from the class-extension through any remaining class-extensions toward the root class of said finalizable object, for each remaining class-extension,
    marking memory related to the remaining class-extension for retention without determining whether the remaining class-extension has a finalizer-free characteristic.

7. A computing apparatus configured to reclaim memory referenced by a finalizable-object, said finalizable-object having been instantiated from a class definition incorporating at least one parent class and one or more class-extensions into a class hierarchy; the apparatus comprising a memory marking logic configured to mark for retention a related memory reachable from a reference field of said finalizable-object, and a finalization-interface logic configured to add said finalizable-object to a finalization set for subsequent invocation of a non-trivial finalize-method; wherein the improvement apparatus to the finalization-interface logic comprises:
    an iteration logic configured to iterate from the ultimate class-extension of said finalizable-object towards the root class of said finalizable-object:
        select an iterated class-extension, said class-extension corresponding to a portion of said finalizable-object that includes said reference field;
        determine whether said class-extension selected by the selection logic has a finalizer-free characteristic;
        in response to determining that said class-extension has a finalizer-free characteristic, mark said related memory for reclamation so that the related memory can be reclaimed by a garbage collection process before an invocation of finalize methods, wherein for any class-extension before a first class-extension without a finalizer-free characteristic, said related memory is marked for reclamation; and
        in response to determining that said class-extension does not have a finalizer-free characteristic, mark said related memory for retention, wherein said related memory cannot be reclaimed until after the invocation of said non-trivial finalize-method.

8. The computing apparatus of claim 7, wherein the conditional marking logic further comprises:
    a now-reclaimable memory determination logic configured to determine whether said related memory is strongly reachable solely through said reference field; and
    an immediate memory reclamation logic configured to reclaim said related memory responsive to the now-reclaimable memory determination logic.

9. The computing apparatus of claim 7, wherein the selection logic, the determination logic, and the conditional marking logic operate on each of a first collection of class-extensions from said one or more class-extensions of said finalizable-object.

10. The computing apparatus of claim 9, further comprising a completion logic responsive to determination by the determination logic that said class-extension does not have said finalizer-free characteristic; the completion logic configured to cause the memory marking logic to operate on said one or more class-extensions that are not members of the first collection of class-extensions.

11. The computing apparatus of claim 7, wherein said class hierarchy comprises a set of hierarchically contiguous class-extensions that have said finalizer-free characteristic, said set of hierarchically contiguous class-extensions including an ultimate class-extension; said set of hierarchically contiguous class-extensions defining a plurality of reference fields in said finalizable-object and said plurality of reference fields including said reference field.

12. The computing apparatus of claim 7, wherein the computing apparatus is at least one selected from the group consisting of a component of a vehicle, a kitchen appliance, a sound device, a video device, a display device, a user interface device, a network device, a storage system, a time-keeping device, a control system, a home security system, and a manufacturing apparatus.

13. A computer program product comprising:
a computer-usable data medium providing instructions that, when executed by a computer, cause said computer to perform a method for reclaiming memory referenced by a finalizable-object, said finalizable-object having been instantiated from a class definition incorporating at least one parent class and one or more class-extensions into a class hierarchy; the product comprising marking for retention a related memory reachable from a reference field of said finalizable-object, and adding said finalizable-object to a finalization set for subsequent invocation of a non-trivial finalize-method; wherein the improvement comprises:
iterating from the ultimate class-extension of said finalizable-object towards the root class of said finalizable-object:
selecting an iterated class-extension, said class-extension corresponding to a portion of said finalizable-object that includes said reference field;
determining whether said class-extension has a finalizer-free characteristic;
in response to determining that said class-extension has a finalizer-free characteristic, marking said related memory for reclamation so that the related memory can be reclaimed by a garbage collection process before an invocation of finalize methods, wherein for any class-extension before a first class-extension without a finalizer-free characteristic, said related memory is marked for reclamation; and
in response to determining that said class-extension does not have a finalizer-free characteristic, marking said related memory for retention, wherein said related memory cannot be reclaimed until after the invocation of said non-trivial finalize-method.

14. The computer program product of claim 13, wherein conditionally performing the marking for retention further comprises:
determining whether said related memory is strongly reachable solely through said reference field; and
reclaiming said related memory.

15. The computer program product of claim 13, wherein selecting, determining, and conditionally performing are applied to each of a first collection of class-extensions from said one or more class-extensions of said finalizable-object.

16. The computer program product of claim 15, wherein the product completes responsive to the determination that said class-extension does not have said finalizer-free characteristic.

17. The computer program product of claim 13, wherein said class hierarchy comprises a set of hierarchically contiguous class-extensions that have said finalizer-free characteristic and said set of hierarchically contiguous class-extensions including an ultimate class-extension; said set of hierarchically contiguous class-extensions defining a plurality of reference fields in said finalizable-object and said plurality of reference fields including said reference field.

* * * * *